Aug. 20, 1963
R. L. MILLER ET AL
3,101,433
CONTROL APPARATUS
Filed Dec. 31, 1958
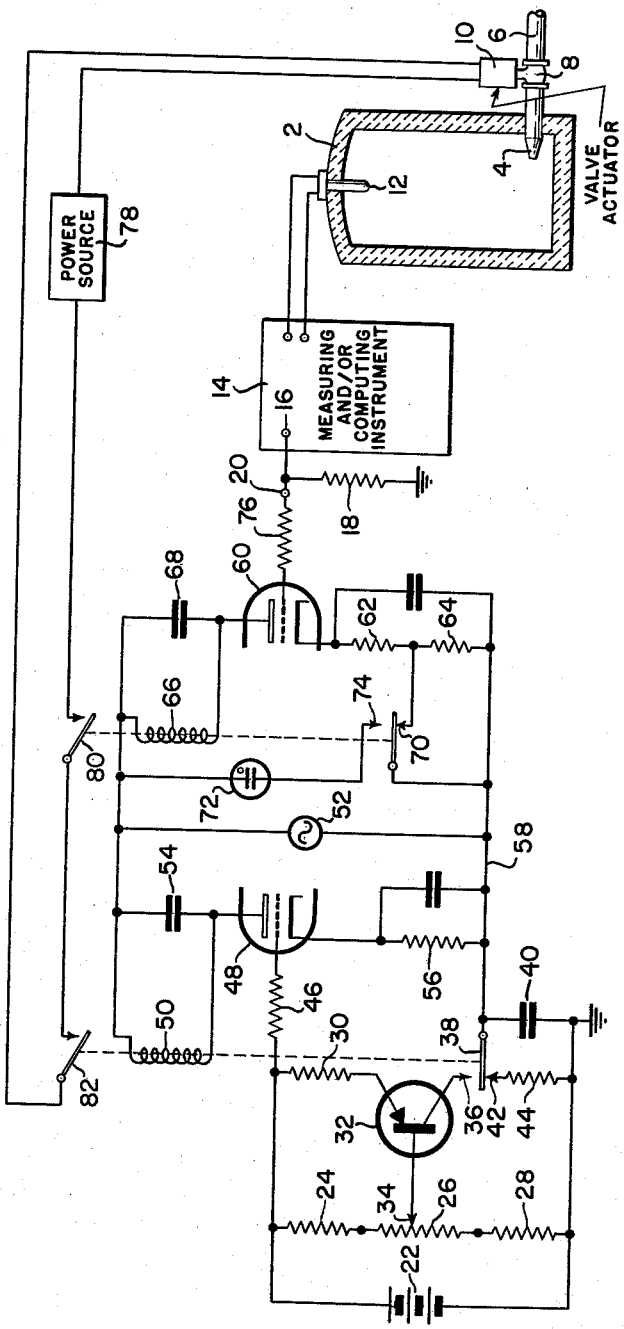
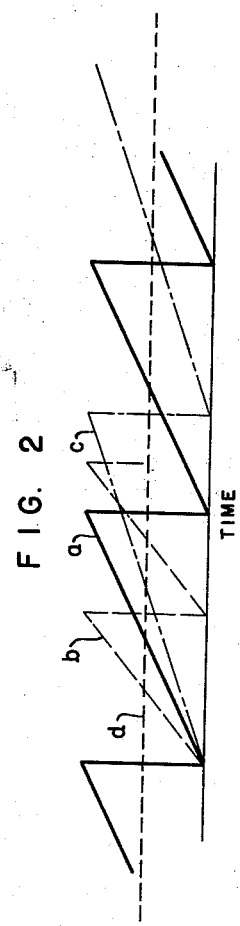
INVENTORS.
ROBERT L. MILLER
RUDOLPH J. WOLF, JR.
BY
*Arthur H. Swanson*
ATTORNEY.

United States Patent Office 3,101,433
Patented Aug. 20, 1963

3,101,433
CONTROL APPARATUS
Robert L. Miller, Hatboro, and Rudolph J. Wolf, Jr., Roslyn, Pa., assignors to Minneapolis-Honeywell Regulator Company, Minneapolis, Minn., a corporation of Delaware
Filed Dec. 31, 1958, Ser. No. 784,143
14 Claims. (Cl. 317—149)

The present invention relates generally to automatic electric control apparatus, and relates specifically to automatic electric proportioning control apparatus of the time-proportioning type, wherein a control action is made proportional in magnitude to the need therefor by adjustment of the ratio of the control "on" time to "off" time in accordance with the demand of the process or other arrangement being controlled.

A general object of the present invention is to provide improved automatic electric control apparatus of the time proportioning type, by means of which proportional control of a process or other arrangement is effected in an improved manner by the automatic adjustment of the ratio of the control "on" time to the control "off" time in accordance with the demand or need for control action of the controlled arrangement.

In the automatic control processes requiring a proportional type of control for proper operation, numerous processes have been encountered which cannot tolerate so-called throttling control wherein the instantaneous rate of flow of an agent is made proportional to a measured value of a controlled condition. Examples of such processes are certain fuel-fired furnaces which cannot tolerate fuel valve throttling in the control of fuel flow rate to maintain a constant temperature.

As an illustration, it is noted that a wide car-bottom furnace must be fired at maximum rate, when heat is needed in order that the flame be uniformly distributed so as to produce the same degree of heat across the charge. In such a furnace, if the temperature is controlled by proportional adjustment of throttling of the rate of fuel flow, undesirably uneven heating of the charge occurs.

However, if the temperature of such a furnace is controlled on a time-proportioning basis, unifrom heating across the charge results. Such control is effected by operating the fuel supply valve between maximum and minimum open positions, and by proportioning the fuel input to the furnace in pulses, the ratio, during any given period, of "valve maximum open" or "on" time to the total period of time being made proportional to the need for heat as indicated by the measured furnace temperature. By definition, the total time is equal to the "valve maximum open" or "on" time plus the "valve minimum open" or "off" time.

Time proportioning control is also required for the control of the temperature of electric furnaces where it is not feasible to vary the furnace heater energizing current between its maximum and minimum or "off" valves, and where, therefore, the heating current must fully be on when heat is called for. The control apparatus of the present invention fulfills this requirement by proportioning or regulating the furnace heat input by varying the ratio of heating current "on" time to the total time in accordance with the furnace load demand.

In accordance with previous efforts at accomplishing a time-proportional control, wherein resort has been had the use of either a thermal bridge or the charging characteristic of a capacitor, it has been found that since both of these techniques result in apparatus that follows an exponential curve, for varying conditions of operation, the time cycle would not remain constant.

It is accordingly an object of the present invention to provide improved time proportioning apparatus wherein the time cycle remains constant throughout the range of operating conditions.

It is another object of the present invention to provide an improved time proportioning controller as set forth wherein the time cycle will remain constant at a selected value, but includes means for pre-selecting the time cycle.

It is a further object of the present invention to provide an improved controller as set forth, which is capable of converting an input current or voltage signal into a time proportional "on"—"off" pulse signal.

A further object of the present invention is to provide a time proportioning controller as set forth wherein compensations for varying conditions in the signal may be performed prior to the application of the signal to the pulsing circuit.

Still another object of the present invention is to provide an improved saw-tooth wave signal generator.

In accomplishing these and other objects, there has been provided, in accordance with the present invention, a saw-tooth wave generator wherein a charging capacitor is charged from a constant current source, such as it represented by a series transistor, to produce a linear ramp function. The ramp function is applied to control the cathode grid bias on a vacuum tube which in turn controls the operation of a relay. One pair of contacts on the aforesaid relay effectively shorts out the charging capacitor at the end of the pre-set time cycle thus forming the saw-tooth wave. The saw-tooth wave thus developed is applied as bias to the cathode of a second vacuum tube which has a second relay connected in series with the anode circuit thereof. The controlling signal is applied as grid bias to the second vacuum tube thereby controlling the conductivity of the second vacuum tube and, hence, the operation of the second relay as a proportional function of the time-cycle determined by the aforementioned saw-tooth wave.

A better understanding of this invention may be had from the following detailed description when read in connection with the accompanying drawings in which:

FIG. 1 is an illustration of a control system embodying the present invention, and FIG. 2 shows a set of curves representative of the operating characteristics of the control system in accordance with the present invention.

Referring now to the drawing in more detail there is shown in FIG. 1 a furnace 2 having a flame nozzle 4 which feeds fuel to the furnace from a fuel supply line 6 past a control valve 8. The valve 8 may be any one of a number of suitable valves which may be operated between a fully opened and a minimum opened or "closed" position by operation of a signal responsive valve actuator 10. The temperature in the furnace is sensed by a thermocouple 12. The thermocouple signal is applied as input to a suitable instrument 14 which may be any one of a number of different types of instruments. The instrument 14 may, for example, be means for controlling and amplifying the derived signal. The controlling function may, of course, include such characteristic adjustments of the signal as are frequently found in electric or other process controllers. These functions are identified as "rate," "reset" and "proportional band" adjustments of the signal. In the event that the instrument 14 is a controller, as set forth herein, the output signal will be a current signal applied to the terminal 16. The current at terminal 16 is applied across a variable resistor 18 to produce a voltage signal at the terminal 20. This voltage signal will be applied as input signal or controlling signal to the time proportioning circuit of the present invention.

This time proportioning circuit includes a direct current power supply represented by the battery 22. The positive terminal, of the battery 22 is connected through a first limiting resistor 24, through a slidewire resistor 26, and a second limiting resistor 28, thence to the negative terminal of the battery 22. The positive terminal of the battery 22 is also connected through a biasing resistor 30 to the emitter electrode of a transistor 32. The base electrode of the transistor 32 is connected to a slider 34 which operates along the aforementioned slidewire resistor 26. The collector electrode of the transistor 32 is connected to a normally opened contact 36 of a switch 38. A movable element of the switch 38 is connected to one side of a charging capacitor 40, the other side of which is connected to the negative terminal of the battery 22.

A second and normally closed contact 42 of the switch 38 is arranged to short-circuit the capacitor 40 through a small current-limiting resistor 44. The positive terminal of the battery 22 is also connected through a coupling resistor to the control grid of a vacuum tube 48. The anode of the tube 48 is connected through the operating coil of a relay 50 to a suitable power supply 52. A time constant determining capacitor 54 is connected in parallel with the relay coil 50. The cathode of the tube 48 is connected through the cathode bias resistor 56 and its by-pass capacitor, to the bus 58 which is in turn connected to the junction between the movable element of the switch 38 and the capacitor 40. Thus, this bus carries the ramp function generated by the foregoing circuitry. The power source 52 is also referred to the bus 58.

A second vacuum tube 60 has its cathode connected through a pair of series connected resistors 62 and 64 to the bus 58. Here, again, there is provided the usual cathode by-pass capacitor. The anode of the tube 60 is connected through the operating coil of a second relay 66 to the power source 52. The coil 66 is also provided with a time constant determining capacitor 68. The junction between the two resistors 62 and 64 in the cathode of the tube is connected through a pair of normally closed contacts to the bus 58. Thus when the contacts are closed the resistor 64 is shorted out. A neon lamp indicator 72 is connected through a pair of normally opened contacts 74 across the power supply 52. The contacts 70 and 74 are both operated by the relay 66. The grid of the vacuum tube 60 is connected through a coupling resistor 76 to the terminal 20 which it will be recalled has a control signal supplied thereto.

A power source 78 is connected to energize the valve actuator and whenever the circuit interconnecting the power source 78 and the valve actuator is completed. In order for this circuit to be completed two separate contacts must both be closed, the first of these contacts 80 is arranged to be closed, whenever the relay 66 is suitably energized. The second of the contacts 82 is arranged to be closed whenever the relay 50 is suitably energized.

Assume that all of the switch contacts are moved to the position shown. The tube 48 will be biased into maximum conduction. When that happens, the coil 50 of the first relay is energized, actuating the switches associated therewith, that is the switch 38 will be closed on contact 36 and the contact 82 will be closed. When the switch 38 closes on the contact 36 current flows through the transistor 32 at a rate determined by the bias on the base thereof, which bias is in turn, selected by the position of the slider 34 along the slidewire 26. For any given position of the slider 34 along the slidewire 26, the current through the transistor will be constant. This current appears as a charging current for the capacitor 40. Since the current through the transistor is constant, the charge on the capacitor 40 builds up linearly with time. As the charge on the capacitor 40 builds up, the grid to cathode bias relationship of the tube 48 is diminished until the current drawn by the tube 48 is insufficient to maintain the energization of the relay 50.

When the relay 50 is deenergized the contact 36 of the switch 38 is opened and the contact 42 is closed, thereby short circuiting the capacitor 40. This substantially instantaneously drops the potential on the bus 58 to the point whereat the tube 48 again begins to conduct sufficiently to energize the relay 50. The foregoing operation produces on the bus 58 a voltage characteristic such as represented by the curves of FIG. 2. In that figure, curve $a$ is selected to represent the saw-tooth wave generated by the cooperation of the foregoing circuit elements, with the slide 34 at some middle value along the slidewire 26; while curve $b$ shows a corresponding characteristic, but with a shorter charging time for the capacitor 40 due to higher current flow through the transistor 32. Similarly curve $c$ shows a corresponding curve, but with a longer charging time due to a lower current flow through the transistor 32. These last two mentioned curves of course represent the operation of the circuit with the slider 34 at different positions along the slidewire resistor 26. It may be noticed that the forward slope or ramp function of these curves is substantially linear with respect to time and the drop-off or discharge of the capacitor 40 is substantially instantaneous. It should also be noted that the time during which the relay 50 is deenergized is extremely short. This may be seen when it is realized that as soon as the capacitor 40 has discharged to the point whereat the bias is reestablished between the grid and the cathode of the tube 48, the tube 48 will immediately begin heavy conduction again.

The saw-tooth voltage characteristic thus generated is applied as bias to the cathode of the second tube 60. This bias is compared with the signal applied to the grid as input control signal from the terminal 20. So long as the bias applied to the grid from the terminal 20 is sufficiently higher than the cathode bias applied from the bus 58, the tube 60 will be in such a state of conduction that the second relay 66 will be energized, closing the contact 80. During this time, of course, the contacts 82 are closed. Under these conditions, power from the source 78 is applied to the valve actuator 10, thereby opening the valve 8 to its maximum position, allowing fuel to flow into the furnace through the nozzle 4. When, however, the bias on the bus 58 has progressed sufficiently far up the forward slope that the differential bias between the cathode and grid of the tube 60 is such that the conductivity of the tube is insufficient to maintain the energization of the relay 66, that relay drops out, opening the contact 80. This value may be represented by the line $d$ through the curves of FIG. 2. In FIG. 2 this line $d$ is illustrated as being that about the 50% "on" time position. The relative position of the line $d$ with respect to the curves $a$, $b$, or $c$, will of course be determined by the magnitude of the signal applied to the terminal 20 to the grid of the tube 60. If the signal applied from the terminal 20 is greater, then the line $d$ will appear higher with respect to the curves $a$, $b$, or $c$, thus indicating a larger percent "on" time, whereas if the signal applied from the terminal 20 were lower the line $d$ would be lower with respect to the curves $a$, $b$, or $c$ indicating a lower percent "on" time.

Since it is characteristic of relays that the current level necessary to cause the relay to be energized is somewhat greater than the current level necessary to hold it in an energized condition, that is, the pickup current is greater than the drop out current, there appears an area in the lower percent "on" time region during which control may not be exercised. However, in order to overcome this apparent inherent characteristics of relays, a bias compensation is inserted. Inasmuch as there is always some current flowing through the tube 60 from the source 52 a measure of cathode bias is obtained by the flow of this current through the resistor 62, and the normally closed contacts 70. Whenever the current through the tube 60 is sufficient to cause the relay 66 to be energized, the normally closed contact 70 is opened. This, then causes the cathode bias to be established across the sum of the two series resistors 62 and 64, producing a corresponding shift in the magnitude of the cathode bias. This shift in the cathode bias due to the opening of the relay contacts 70 is of a magnitude and in a direction compensate for the aforementioned differential in the pickup and drip out current of the relay 66. Thus, percent "on" time can be controlled substantially down to zero percent "on" time.

The glow-tube or other indicating device 72 is connected in a circuit arranged to be interrupted by the normally open contact 74 of the relay 66. Whenever the relay 66 is energized so that the valve 8 is open admitting fuel into the furnace 2, the relay contact 74 is closed completing the circuit to the glow tube 72, causing the same to be lit as an indication of the opened condition of the valve 8.

The arrangement with the two sets of relay contacts 80 and 82 connected in series and operated separately by the two relays 50 and 66, respectively, constitutes a fail safe feature. Both relays must be energized in order for the valve actuator to be energized. Thus any event which would cause the first tube 48 to cease conducting sufficiently to energize the relay 50 would also cause the circuit to the valve actuator to be opened.

It will be appreciated that while the invention has been described, as including the two vacuum tubes 48 and 60, other suitable current controlled devices may be substituted therefor without departing from the spirit and scope of the present invention. It will, of course, be apparent that suitably arranged transistors can be substituted for the tubes 48 and 60. Similarly, other functions than a valve actuator may be controlled by the periodic pulsing of the power from the source 78.

Thus it may be seen that there has been provided in accordance with the present invention an improved time proportioning controller wherein the time cycle remains constant at a selected value irrespective of the operating range of the system and which includes a novel saw-tooth wave generator.

What is claimed is:

1. A linear sawtooth wave signal generator comprising a charging capacitor, a source of electrical energy, a transistor connected in series with said capacitor and said source, means for selectively biasing said transistor to produce a predetermined constant current therethrough whereby to charge said capacitor at a linear rate, means defining a discharge circuit for said capacitor, switch means operative in response to the build-up of a charge on said capacitor to a predetermined level to disconnect said capacitor from said transistor and to connect said capacitor to said discharge circuit, said switch means being further operative to reconnect said capacitor to said transistor upon discharge of said capacitor, and output means connected to said capacitor.

2. A linear sawtooth wave signal generator comprising a charging capacitor, a constant current circuit including a transistor, switch means for selectively connecting said capacitor to said circuit whereby to develop a charge on said capacitor, means defining a discharge circuit for said capacitor, means responsive to the development of said charge on said capacitor to a predetermined level to actuate said switch means to disconnect said capacitor from said constant current circuit and to connect said capacitor to said discharge circuit, said charge responsive means being further operative to reconnect said capacitor to said constant current circuit upon discharge of said capacitor, and output means connected to said capacitor.

3. A sawtooth wave signal generator as set forth in claim 2 and including means for adjusting the rate of the flow of current in said constant current circuit whereby to adjust the cyclic repetition rate of the generated sawtooth wave signal.

4. A linear sawtooth wave signal generator comprising a charging capacitor, a constant current circuit including a transistor and means for applying electrical energy thereto, a switch means for selectively connecting said capacitor to said constant current circuit whereby to develop a charge on said capacitor, a relay having an operating winding, means for applying an energizing current to said operating winding, a current control means for controlling the flow of energizing current through said winding, said current control means being connected to said capacitor to deenergize said relay in response to the development of a charge on said capacitor to a predetermined level, said switch means being a set of contacts on said relay and operative upon deenergization of said relay to disconnect said capacitor from said constant current circuit and to connect said capacitor to a discharge circuit, said current control means being further operative to reenergize said relay in response to the discharge of said capacitor, and output means connected to said capacitor.

5. A linear sawtooth wave generator comprising a charging capacitor, a source of electrical energy, a transistor connected in series with said capacitor and said source, biasing means connected to said source to derive therefrom a biasing signal for selectively biasing said transistor to produce a predetermined constant current therethrough whereby to charge said capacitor at a linear rate, means defining a discharge circuit for said capacitor, switch means operative in response to the build-up of a charge on said capacitor to a predetermined level to disconnect said capacitor from said transistor and to connect said capacitor to said discharge circuit, said switch means being further operative to reconnect said capacitor to said transistor upon discharge of said capacitor, and output means connected to said capacitor.

6. A time proportioning control apparatus comprising, in combination, means for generating a linear sawtooth wave voltage signal, a current control device, means for applying a control signal to said current control device, means for applying said sawtooth wave signal as bias to said current control device for cyclic comparison with said control signal whereby to control the flow of current through said control device on a time cycle determined by the repetition rate of said sawtooth signal and for a proportionate time during each cycle determined by the relative magnitude of said control signal, and output operation control means responsive to the current flow through said current control means.

7. A time proportioning control apparatus comprising means for generating a linear sawtooth wave voltage signal, a relay having an operating winding, means for applying an energizing current to said operating winding, a current control means for controlling the flow of energizing current through said winding, means for applying a control signal to said current control means, means for applying said sawtooth wave signal as bias to said current control means for cyclic comparison with said control signal whereby to control the flow of energizing current through said operating winding on a time cycle determined by the repetition rate of said sawtooth wave signal for energizing said relay during at least a portion of each cycle, said portion being determined by the relative magnitude of said control signal, and an output means responsive to the operation of said relay.

8. A time proportioning control apparatus comprising means for generating a linear sawtooth wave voltage signal; said means including a constant current circuit including a transistor, a charging capacitor, switch means for selectively connecting said capacitor to said constant current circuit whereby to develop a charge on said capacitor, means responsive to the development of said charge on said capacitor to a predetermined level to actuate said switch means to disconnect said capacitor from said constant current circuit and to connect said capacitor to a discharge circuit, said charge responsive means being further operative to reconnect said capacitor to said constant current circuit upon discharge of said capacitor; a relay having an operating winding, a current control means for controlling the flow of energizing current through said winding, means for applying a control signal to said current control means, and means for applying said sawtooth wave signal developed across said capacitor as bias to said current control means, said control means being operative to compare said control signal and said bias signal and to effect energization of said relay during a portion of each cycle of said sawtooth wave signal depending upon the relative magnitude of said control signal.

9. A time proportioning control apparatus comprising means including a capacitor and a constant current charging circuit therefor for generating a linear sawtooth wave signal, a relay having an operating winding, means for applying an energizing current to said operating winding, a current control means for controlling the flow of energizing current through said winding to control the operation of said relay, means for applying a control signal to said current control means, means for applying said sawtooth wave signal as bias on said current control means, said control means being operative to compare said control signal and said bias signal and to effect energization of said relay during a portion of each cycle of said sawtooth wave signal depending upon the relative magnitude of said control signal.

10. A time proportioning control apparatus comprising means including a capacitor and a constant current charging circuit therefor for generating a linear sawtooth wave signal, a relay having an operating winding, means for applying an energizing current to said operating winding, current control means for controlling the flow of energizing current through said winding, said current control means comprising a vacuum tube having a cathode, control grid and anode, said relay winding being connected in the anode circuit of said tube, means for applying a control signal to said grid of said vacuum tube, means for applying said sawtooth wave signal as bias on said cathode, said vacuum tube being operative to compare said control signal with said bias signal to effect an energization of said relay during a portion of each cycle of said sawtooth wave signal depending upon the relative magnitude of said control signal.

11. A time proportioning control apparatus comprising means for generating a linear sawtooth wave signal, said means including a capacitor, a constant current charging circuit therefor including a transistor, means for connecting said capacitor to said charging circuit to develop a charge on said capacitor, a relay having an operating winding, signal responsive means connected to control the flow of energizing current through said winding, said signal responsive means being operative in response to the development of a charge on said capacitor to a predetermined level to deenergize said relay, switch means included in said relay operative upon deenergization of said relay to disconnect of said capacitor from said charging circuit and to connect said capacitor to a discharge circuit, said signal responsive means being further operative upon discharge of said capacitor to reenergize said relay and thereby to reconnect said capacitor to said charging circuit; a second relay having an operating winding; current control means for controlling the flow of energizing current through said operating winding of said second relay; means for applying a control signal to said current control means; means for applying said developed sawtooth wave signal as bias on said current control means; said current control means being operative to compare said control signal with said bias signal whereby to effect energization of said second relay during a portion of each cycle of said sawtooth wave signal depending upon the relative magnitude of said control signal.

12. The invention as set forth in claim 11 and characterized by the addition of means responsive to the energization of said second relay for modifying the bias on said current control means.

13. The invention as set forth in claim 11 and characterized by the addition of means responsive to the energization of said second relay for visibly indicating such energization.

14. A time proportioning control apparatus comprising means for generating a sawtooth wave signal, a relay having a signal responsive element, a control member for controlling a signal applied to said signal responsive element, means for applying a control signal to said control member, means for applying said sawtooth wave signal as bias to said control member, said control member being operative to compare said control signal and said bias signal to effect an actuation of said relay during a portion of each cycle of said bias signal depending upon the relative magnitude of said control signal.

References Cited in the file of this patent

UNITED STATES PATENTS

| | | |
|---|---|---|
| 2,250,708 | Herz | July 29, 1941 |
| 2,426,910 | Wilson | Sept. 10, 1947 |
| 2,453,787 | Downs | Nov. 16, 1948 |
| 2,583,792 | Nelson | Jan. 29, 1952 |
| 2,589,085 | Houghton | Mar. 11, 1952 |
| 2,602,151 | Carbrey | July 1, 1952 |
| 2,684,443 | Tidball | July 20, 1954 |
| 2,864,978 | Frank | Dec. 16, 1958 |